United States Patent
Tabler

(10) Patent No.: US 7,686,156 B2
(45) Date of Patent: Mar. 30, 2010

(54) SLIP TUBE SYSTEM FOR ADJUSTING DRIVE FORCE OF SHAFT DRIVEN CONVEYOR SYSTEM

(75) Inventor: Charles Paul Tabler, Cincinnati, OH (US)

(73) Assignee: OCS IntelliTrak, Inc., Cincinnati, OH (US)

( * ) Notice: Subject to any disclaimer, the term of this patent is extended or adjusted under 35 U.S.C. 154(b) by 28 days.

(21) Appl. No.: 12/233,820

(22) Filed: Sep. 19, 2008

(65) Prior Publication Data

US 2009/0078535 A1  Mar. 26, 2009

Related U.S. Application Data

(60) Provisional application No. 60/974,294, filed on Sep. 21, 2007.

(51) Int. Cl.
*B65G 43/08* (2006.01)
(52) U.S. Cl. .................... 198/465.4; 198/685
(58) Field of Classification Search ............. 198/465.3, 198/465.4, 678.1, 685, 833, 834; 104/166
See application file for complete search history.

(56) References Cited

U.S. PATENT DOCUMENTS

| 3,164,104 | A | | 1/1965 | Hunt |
| 3,850,280 | A | | 11/1974 | Ohrnell |
| 4,203,511 | A | | 5/1980 | Uhing |
| 5,785,168 | A | | 7/1998 | Beall |
| 5,806,655 | A | | 9/1998 | Tabler |
| 5,919,023 | A | * | 7/1999 | Owens, Jr. ............... 198/465.4 |
| 6,032,785 | A | * | 3/2000 | Beall, Jr. .................. 198/465.4 |
| 6,170,642 | B1 | * | 1/2001 | Galan et al. ............. 198/678.1 |
| 6,267,060 | B1 | * | 7/2001 | Owens, Jr. .................. 104/166 |
| 6,293,388 | B1 | * | 9/2001 | Felter ...................... 198/465.4 |
| 7,134,542 | B1 | * | 11/2006 | Noestheden ............. 198/465.4 |
| 7,178,661 | B2 | | 2/2007 | Tabler |
| 7,562,763 | B2 | * | 7/2009 | Tabler ..................... 198/465.4 |

* cited by examiner

*Primary Examiner*—James R Bidwell
(74) *Attorney, Agent, or Firm*—Frost Brown Todd LLC

(57) ABSTRACT

A slip tube system is configured to transport a load along a conveying path of an overhead conveyor system. A stationary frame has at least one rotating shaft with a shaft axis extending along the conveying path of the stationary frame, and a movable carriage configured to transport a load along the conveying path. A slip tube is placed on at least one of the least one rotating drive shafts and each slip tube has an inner diameter larger than the outer diameter of a respective drive shaft, and is in rotational sliding engagement therewith. At least one driven wheel is attached to the carriage to engage with an exterior of the slip tube surrounding the at least one rotating drive shaft to push the slip tube into driving engagement with the rotating shaft, and to rotate the slip tube therewith. The driven wheels are canted with respect to a shaft axis of the drive shaft and slip tube, and the canted contact produces a helical loci of engagement between the exterior of the slip tube and each of the driven wheels. As the drive shaft rotates, traction is developed between the rotating shaft and an inner surface of the slip tube, and between an outer surface of the rotating slip tube and the driven wheels to provide sufficient drive force to propel the carriage and the load along the conveying path.

20 Claims, 4 Drawing Sheets

SLIP TUBE SYSTEM FOR ADJUSTING DRIVE FORCE OF SHAFT DRIVEN CONVEYOR SYSTEM

CROSS REFERENCE TO RELATED APPLICATIONS

The present application hereby claims the benefit of the provisional patent application of the same title, Ser. No. 60/974,294, filed on Sep. 21, 2007.

FIELD OF THE PRESENT SLIP TUBE DRIVE

The present slip tube drive is a drive system for adjusting a drive force of a shaft driven conveyor system and relates, in general, to an overhead conveyor system with a carriage suspended therefrom and a rotating drive shaft configured to drive the carriage along the overhead conveyor system via a slip tube system.

BACKGROUND

In a conventional factory or distribution warehouse, it is desirable to move loads along a transporting path that is predominately horizontal, but which may also involve travel uphill, downhill, diversion between subpaths, and the like. These systems provide an overhead conveyor system with rotating drive shafts, a carriage that is supported by the drive shaft or by a fixed support rail, and a carriage that has skewed drive wheels to engage with the rotating drive shaft. The engagement of the skewed wheels with the rotating drive shaft propels the carriage along the rotating drive shaft or along a fixed rail.

The present slip tube system relates to overhead conveyors of the type disclosed in U.S. Pat. No. 5,806,655 issued Sep. 15, 1998 to Tabler, in U.S. Pat. No. 5,785,168 issued Jul. 28, 1998 to Beall, Jr., in U.S. Pat. No. 4,203,511 issued May 20, 1980 to Uhing, in U.S. Pat. No. 3,164,104 issued Jan. 5, 1965 to Hunt, and in U.S. Pat. No. 3,850,280 issued Nov. 26, 1974 to Ohrnell. Shaft driven overhead conveyors have many advantages over the heavier load type conveyors such as the power and free conveyor; such advantages including quietness, cleanliness, less repair, easy diversion of load carrying carriages, buffering, speed variation along the conveying path, and generally greater flexibility in design.

Conventional prior art rotating shaft driven overhead conveyors may be limited in the amount of weight they may carry, in a slope of the incline/decline they may traverse, or in combinations of weight and the incline or decline. When in these situations, the carriage can undergo an uncontrolled slippage between the drive shaft and the driven wheels. For steep inclines and over heavy loads, the load cannot be propelled along the conveyor. For steep declines, the load can slide in an uncontrolled manner down the decline.

The present slip tube system addresses issues associated with prior art overhead conveyers having fixed axis, rotatable drive shafts engaging skewed driven wheels of a carriage to provide the carriage conveying force, wherein the carriage is supported by the drive shaft and/or a fixed support rail. This well known slippage problem of the rotatable drive shaft type of overhead conveyor has been partially solved by sandblasting and then anodizing aluminum drive shafts to increase the friction therebetween, which adds expensive processing to the manufacturing. Though this is an improvement for some applications, in many cases, it is not enough. Moreover, sand blasting is hard on the drive wheels and the sand blasted surface loads up with dirt over time, and becomes less effective. Another solution that has been proposed is the overcoating of the drive tube with a high-friction material such as urethane. However, such coatings are expensive and can lift or peel. Also, once a tube has been sandblasted or overcoated, it is not readily available to be used on another part of the same line or another line where the higher friction may not be necessary or even undesirable. In addition to inclines and to a lesser extent, declines, the problem arises in other circumstances, for example: when a carriage with spaced apart trolleys for a single load (two trolleys being used to carry a greater load than can be carried with a single trolley) passes through a switch. Switches re-route a carriage traveling on one line to travel on another line. A trolley passing through the switch may not be powered, so that the rear trolley is the sole drive into the switch, and the front trolley is the sole drive out of the switch. In such a situation, the driving power is cut in half through the switch and slippage is more likely to occur, for example when the load is particularly heavy in the high load overhead conveyor of U.S. Pat. No. 5,785,168 issued Jul. 28, 1998, whose disclosure is incorporated herein in its entirety, by reference. Other solutions to the slippage problem can include drive ridges to increase traction such as that taught by Tabler in U.S. Pat. No. 7,178,661.

Alternately, there can be times when it is desired to have slippage (less friction) between the carriage drive wheels and the drive shaft. These instances can occur when a carriage containing a load is being driven by a rotating shaft, and encounters a stop. Stops can be found in an assembly environment to provide time for workers to complete an assembly task on one item before sending the completed item onto another work station via the overhead conveyer, or to accumulate a stack of items to be released one at a time in timed manufacturing. Once the stop is released, it is also desirable for the slipping system to re-engage with the rotating drive shaft to propel the carriage away from the stop.

Consequently, a significant need exists to be able to change the drive friction between the drive shaft and driven rollers of the rotatable drive shaft type of overhead conveyor systems, to make the drive friction changes work with conventional rotatable drive shafts without modification to the drive shafts, to make the drive friction changes easy to install or remove on existing drive components, and to provide more or less motive/drive force on the carriage as required.

BRIEF SUMMARY OF THE SLIP TUBE SYSTEM

The slip tube system overcomes the above-noted and other deficiencies of the prior art by providing a slip tube drive system for propelling at least one load along a conveying path of an overhead conveyor system. The slip tube system comprising a stationary frame extending along the conveying path and a rotating drive shaft extending along the conveying path and mounted to the stationary frame. The rotating drive shaft rotating about a shaft axis parallel to the conveying path and having an outer surface extending there along. A hollow slip tube can be mounted on the rotating drive shaft and has an inner slip tube diameter larger than an outer diameter of the rotating drive shaft to provide slipping engagement therebetween. The hollow slip tube further comprising an outer sleeve diameter larger than the inner sleeve diameter and an outer drive surface extending therealong. A carriage is provided and is configured to carry a load along the stationary frame extending along the conveying path. At least one driven wheel is mounted on the carriage and free to rotate thereto with the at least one driving wheel canted at an angle to the shaft axis of the drive shaft and configured to engage with the outer drive surface of the hollow slip tube slidingly mounted on the rotating drive shaft. Wherein when the least one driving wheel is engaged with the outer drive surface of the hollow slip tube, the hollow slip tube is tractionally biased from slipping engagement into rotating driven engagement with the rotating drive shaft and the rotating outer drive surface of the rotating hollow slip tube tractionally engages with the at least one driving wheel with sufficient traction so as to form a helical loci of engagement therewith to propel the carriage along the conveying path.

In one aspect of the slip tube system, a slip tube system is provided for propelling at least one load along a conveying path of an overhead conveyor system. The slip tube system comprising a stationary frame extending along the conveying path and a rotating drive shaft extending along the conveying path and mounted to the stationary frame for rotation about a shaft axis that is parallel to the conveying path. The rotating drive shaft further comprises an exterior surface having an outer diameter. A hollow sleeve is mounted on the rotating drive shaft. The hollow sleeve has an inner sleeve diameter larger than the outer diameter of the drive shaft and an outer sleeve surface having an outer sleeve diameter larger than the inner sleeve diameter and wherein the hollow sleeve and the rotating drive shaft have rotational sliding engagement therebetween. A carriage is configured to carry the load along the hollow slip tube mounted on the rotating drive shaft with at least one driven wheel mounted on the carriage. The at least one driven wheel free to rotate thereto with the at least one driving wheel canted at an angle to the shaft axis of the drive shaft and configured to engage with the outer sleeve surface of the hollow sleeve slidingly mounted on the rotating drive shaft. Wherein when the least one driving wheel is engaged with the outer sleeve surface of the hollow slip tube, the hollow sleeve is biased from slipping engagement into rotating driven engagement with the rotating drive shaft and the rotating outer sleeve surface of the rotating hollow sleeve engages with the at least one driving wheel with sufficient traction so as to form a helical loci of engagement therewith to propel the carriage along the conveying path. A carriage stop is also provided and is configured to stop the carriage, wherein when the carriage encounters the stop, the hollow sleeve in helical engagement with the at least one driven wheel is further configured to change from driving engagement with the rotating drive shaft to slipping engagement with the rotating drive shaft.

And in yet another aspect of the slip tube system, a method is disclosed for adjusting the coefficient of friction of a rotating drive shaft in an overhead conveyor system for carrying a load along a conveying path. The method comprises a first step of introducing at least one slip tube concentrically mounted on the rotating drive shaft to surround an outer surface thereof the rotating drive shaft. The at least one slip tube is configured to rotate the rotating drive shaft. The slip tube comprises an inner cylindrical surface with a preselected coefficient of friction and an outer surface having a second preselected coefficient of friction and wherein the inner cylindrical surface has an inner diameter larger than an outer diameter of the drive shaft. The method further comprises a second step of engaging the load with the at least one slip tube to frictionally engage the inner cylindrical surface of the at least one slip tube with the rotating drive shaft to move the load along the conveying path.

These and other objects and advantages of the present slip tube system shall be made apparent from the accompanying drawings and the description thereof.

BRIEF DESCRIPTION OF THE FIGURES

The accompanying drawings, which are incorporated in and constitute a part of this specification, illustrate embodiments of the slip tube system, and, together with the general description of the slip tube system given above, and the detailed description of the embodiments given below, serve to explain the principles of the present slip tube system.

DETAILED DESCRIPTION OF THE SLIP TUBE DRIVE

Figure 1:
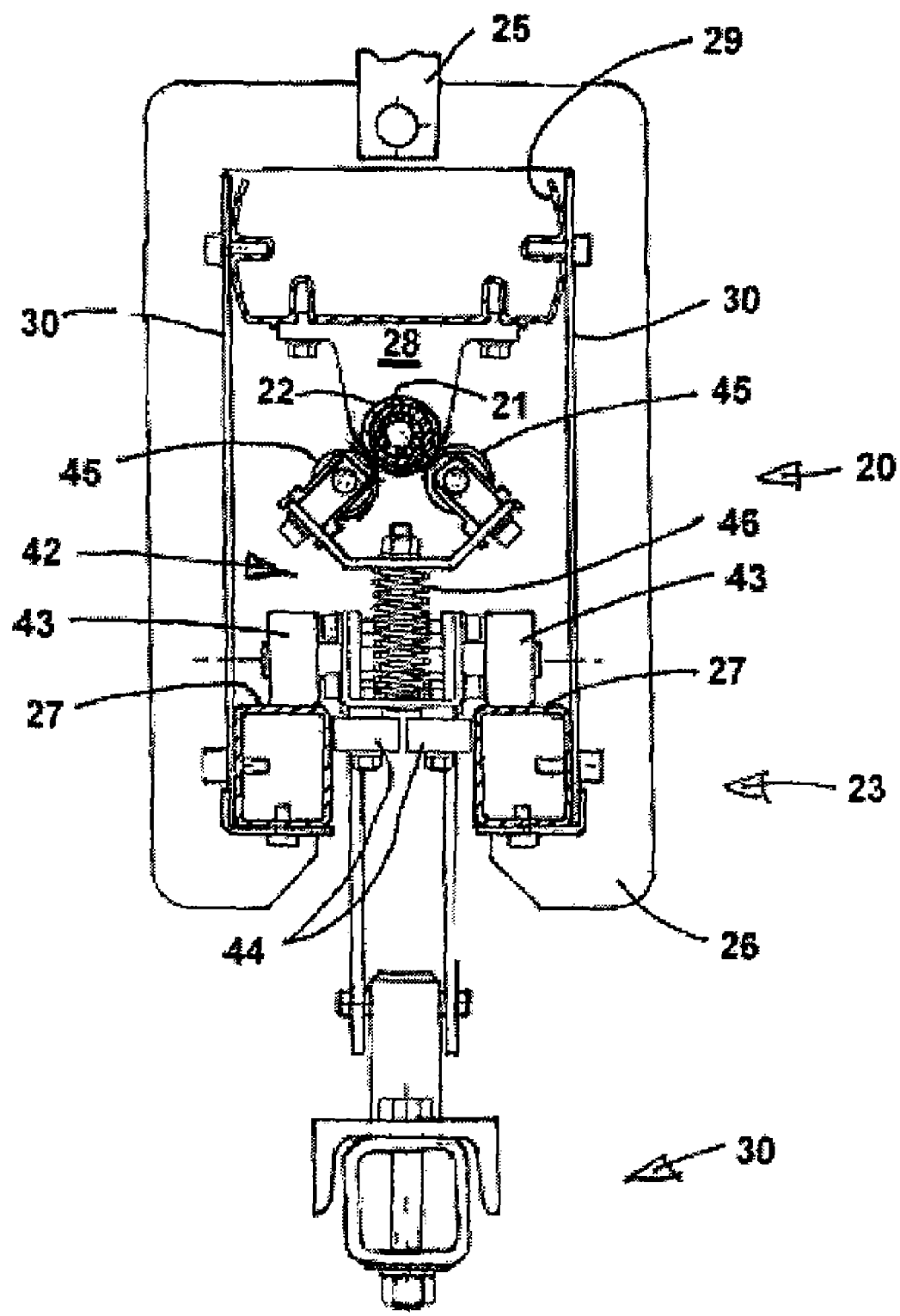
FIG. 1 is an end cross sectional view of an overhead conveyor system having a slip tube drive.

The following description of certain examples of the slip tube system should not be used to limit the scope of the present the slip tube system. Other examples, features, aspects, embodiments, and advantages of the of the slip tube system will become apparent to those skilled in the art from the following description, which is by way of illustration, one of the best modes contemplated for carrying out the slip tube system. As will be realized, the slip tube system is capable of other different and obvious aspects, all without departing from the slip tube system. Accordingly, the drawings and descriptions should be regarded as illustrative in nature and not restrictive.

The slip tube system is an overhead conveyor system 20 with one or more movable trolleys 40, 41 to transport a load along a conveying path. The trolleys 40, 41 and load are propelled along the conveying path via a rotating drive shaft 21 or length thereof that engages with one or more canted driven rollers 45 on the carriages 42 to produce a helical loci of engagement, and to thereby produce movement along the conveying path in a direction that depends on the rotational direction of the shaft. The slip tube system further includes an unattached hollow sleeve or slip tube 22 with an inner diameter that is slightly greater than an outer diameter of the rotating drive shaft 21. This clearance provides easy sliding placement of the slip tube 22 onto the rotating drive shaft 21, and allows rotation of the slip tube 22 on the rotating drive shaft 21. In operation, the canted driven rollers 45 on the trolleys 40, 41 bias an interior of the slip tube 22 into driving engagement (or grip) with the rotating drive shaft 21, and an exterior of the engaged slip tube 22 helically engages with the canted driven rollers 45 of the trolleys 40, 41 to propel the trolleys 40, 41. The wall thickness of the slip tube 22 can be thin, and the trolleys 40, 41 can make the transition from an uncovered rotating drive shaft 21 onto a rotating drive shaft 21 covered by a slip tube 22 without any special end preparation or tapers to the slip tube 22. The slip tube 22 can be configured to alter the drive force of the overhead conveyor system 20 by altering the friction coefficients between the rotating drive shaft 21 and the canted driven rollers 45, and advantages of this will be discussed below.

Figure 2:
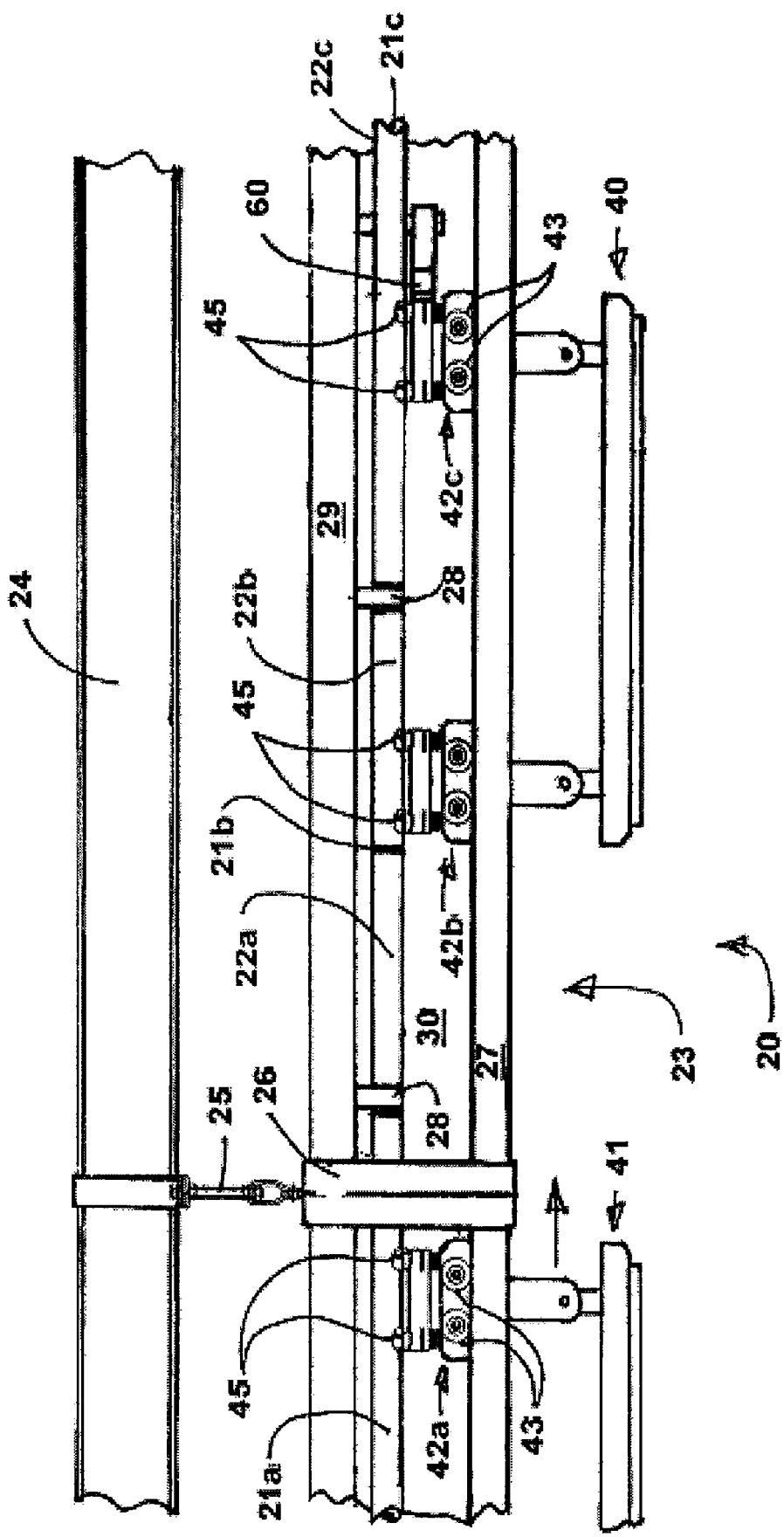
FIG. 2 is a partial side view of the slip tube drive system of FIG. 1.

As shown in FIGS. 1 and 2, the overhead conveyor system 20 has one or more movable trolleys 40, 41 suspended therefrom to transport the load along the conveying path. The overhead conveyor system 20 can support the trolleys 40, 41 on a rotating drive shaft, or can have a stationary frame or a support rail structure 23 extending along the conveying path to support the load. As shown in FIG. 2, the overhead conveyor system 20 may be hung from a support structure such as an I-Beam 24 by a hanger 25. Hanger 25 engages with a support frame 26 to suspend the support rail structure 23 overhead with the trolleys 40, 41 hanging therebelow.

With the support rail structure 23, the rotating drive shaft 21 may be placed adjacent to one or more support rails 27 to propel the trolleys 40, 41 along the support rails 27. The trolleys 40, 41 may be hung from the support rails 27 via at least one carriage 42. For this discussion, each trolley 40, 42 is supported by a pair of carriages, and three carriages are shown in FIG. 2 with identifiers such as a carriage 42a, a carriage 42b, and a carriage 42c. Thus, carriage 40 is shown with carriage 42b, and carriage 42c at each end. In some alternate embodiments, a trolley can hang from a single carriage (not shown).

Turning now to FIG. 1 which shows the present slip tube system, carriage 42 has at least one load wheel 43 configured to ride on support rails 27. Guide wheels 44 can extend from the carriage 42 between the support rails 27 to steer or guide the carriage as it travels along the support rails 27. A pair of canted driven wheels 45 is located at a top of the carriage 42 and is biased with a spring 46 into engagement with the slip tube 22. This engagement biases the slip tube 22 into driving engagement with the rotating drive shaft 21 and thereby rotates the slip tube 22. The rotating the slip tube 22 is in contact with the canted driven wheels 45, which can be constructed from an elastomeric material such as a rubber or a urethane, to produce a helical drive force with the rotating slip tube 22 to propel the carriage 42. If desired, additional pairs of driven wheels 45 can extend from the carriage 42 to increase the drive force to the trolleys 40, 41.

The rotating drive shaft 21 can be a single shaft or tube, or multiple drive shafts placed end to end along the support rail structure 23 and can be formed from a metallic material such as steel or aluminum, or a plastic or composite shaft. Each end of the rotating drive shaft 21 can be hung from a pillow block 28 that is attached to a drive beam 29 and a shaft axis extends longitudinally along each section of the rotating drive shaft 21 (not shown). Covers 30 can be removably attached to the drive beam 29 and the support beams 27 to provide additional structural support, and to cover moving elements for safety. In FIG. 2, one of the covers 30 is removed to show the elements within and three rotating drive shafts 21 are shown rotatably attached to bearings within the pillow blocks 28. The multiple rotating drive shafts 21 can be linked to rotate together with one motive source such as a motor shown in U.S. Pat. No. 6,293,388 to Christopher Felter, which is incorporated by reference in its entirety, or each of the rotating drive shafts 21 can be separately attached to an individual motor (not shown). The use of drive motors are well known in the art, and can use belts, pulleys, gear drives, and the like to rotate the rotating drive shafts 21. Multiple rotating drive shafts 21 offer advantages such modularity, increased bearing surfaces within the pillow blocks for lower bearing loads and longer bearing life, and provide easily replicable shaft sections. Additionally they are easier to transport in shorter lengths, the different drive shafts can be driven at different speeds, and the different sections of drive shafts can use different sized motors to move a load up an incline, provide additional power for heavier loads, or provide less power to move a load down an incline.

In FIG. 2, three rotating drive shafts 21 are present with the rightmost rotating drive shaft 21c completely covered by a slip tube 22c so that the shaft 21c cannot be seen. A center rotating drive shaft 21b is also covered in entirety by a slip tube composed of two separate end-to-end sections of a slip tube section 22a and a slip tube section 22b, the advantages of which will be discussed later. The leftmost drive shaft 21a is without a thin slip tube and the exposed rotating drive shaft 21a is in direct helical drive with the canted driven wheels 45 on carriage 42 of trolley 41. The rotational direction of leftmost rotating drive shaft 21a is indicated by a curved arrow. In FIG. 2, the carriages 42b and 42c of trolley 40 are engaged with the slip tube system positioned to bias the slip tubes 22b and 22c upwards (see FIG. 1) to engage with the rotating drive shaft 21.

Figure 3:
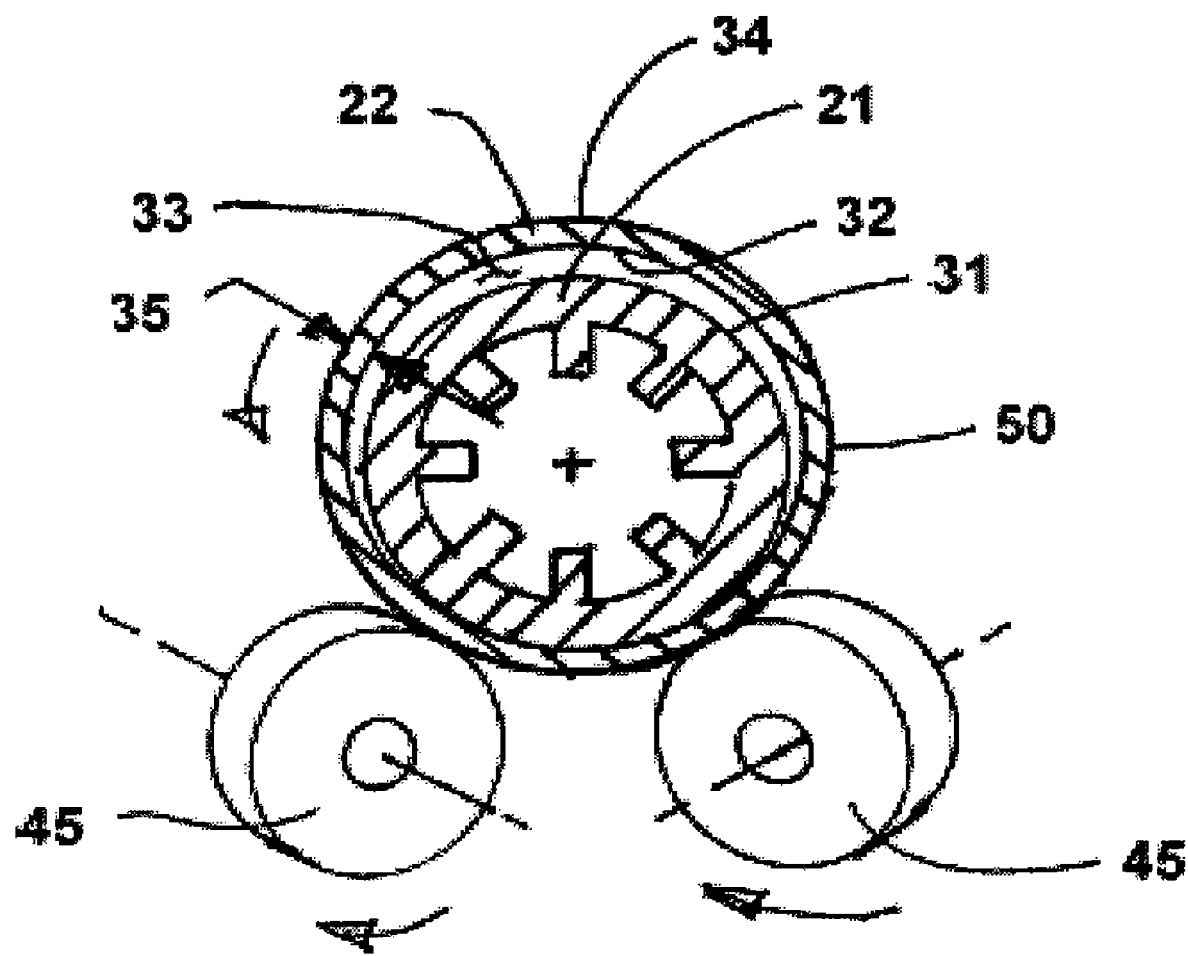
FIG. 3 is an end cross sectional view of the drive elements of the slip tube drive of FIG. 1 with elements of the overhead conveyor system removed for clarity.

FIG. 3 shows an enlarged end view of the slip tube system used to drive trolleys 40, 41 showing the rotating drive shaft 21 positioned within the slip tube 22, and with the canted driven rollers 45 of the carriage 42 biasing the slip tube 22 into engagement with the rotating drive shaft 21. For this discussion, the other elements of the overhead conveyor system 20 such as the carriage 42 and the support rail structure 23 have been removed for clarity, and arrows are provided on FIG. 3 to show the directions of rotation of the elements depicted. As shown, the slip tube 22 is configured to slip over the rotating drive shaft 21 and to have clearance 33 between an outer surface 31 of the rotating drive shaft 21 and an inner surface 32 of the slip tube 22. An outer tube surface 34 of the slip tube 22 is shown biased into driving engagement with the rotating drive shaft 21 by the canted driven rollers 45, and in this view, both rotating drive shaft 21 and the slip tube 22 are rotating counterclockwise together, but at different rotational velocities. When the driven rollers 45 initially engage with the outer tube surface 34 of the slip tube 22, the slip tube 22 is biased into frictional contact between the outer surface 31 of the rotating drive shaft 21 and moves from sliding frictional contact with the rotating drive shaft 21 to driven rotational contact with the rotating drive shaft 21. The canted driven rollers 45 are driven by the outer tube surface 34 of the slip tube 22 when the slip tube 22 is biased into driving engagement with the outer surface 31 of the rotating drive shaft 21, and both canted driven rollers 45 are shown being driven clockwise.

The slip tube 22 of the slip tube system slidably mounts over the rotating drive shaft 21 with a clearance 33 between an outer surface 31 of the rotating drive shaft 21 and an inner surface 32 of the slip tube 22. This clearance 33 enables the slip tube 22 to normally rotate independently about the rotating drive shaft 21. Clearance 33 can be between 0.020 and 3.00, and in one embodiment, at least 0.030 inches. Slip tube 22 can be further configured to cover a substantial portion of the longitudinal length of the rotating drive shaft 21, and can be formed from a material such as but not limited to a thermoplastic that has a desired frictional characteristic. One example, but not limited thereto, of a suitable thermoplastic material commonly known as Butyrate, which is a cellulose ester modified by using butyric and acetic acids producing Cellulose Acetate Butyrate or CAB. One example of a suitable slip tube 22 could be a hollow tube with a 0.030 inch thick wall formed from a Tenite® Butyrate such as that sold by United States Plastics Corporation. The slip tube 22 can be made of different formulations of the same material, or made from different materials to provide different mechanical properties such as different coefficients of friction.

Alternately, in yet another embodiment of the present slip tube system, one or more of the inner surface 32 of the slip tube 22, the outer tube surface 34 of the slip tube 22 and the outer surface 31 of the rotational drive shaft can be coated with a coating 50 to increase or decrease the frictional coefficient of the surface. Coating 50 can be permanently bonded, plated, coated or otherwise secured in any manner to a surface. Thus, one or more coatings 50 can be used to alter the frictional characteristics and drive capabilities of a slip tube system.

With the present slip tube system there are two different coefficients of friction. A first coefficient of friction is between the rotating drive shaft 21 and the surrounding slip tube 22, and a second coefficient of friction is between the slip tube 22 and the canted driven rollers 45 of the carriage 42. Slip tube 22 present slip tube system is configured to be easily installed on any section of the rotating drive shaft 21, and can be installed on systems that lack the present slip tube system by simply detaching a section of the rotating drive shaft 21 from the pillow blocks 28, and sliding the slip tube 22 thereon to substantially cover the section of rotating drive shaft 21. When the covered section of the rotating drive shaft 2 is installed on the pillow blocks 28, the slip tube 22 is free to rotate about the rotating drive shaft 21 until biased upwards by the drive rollers 45 as described above. The present slip tube system offers advantages in that previously installed overhead conveyor systems can be easily upgraded to a slip tube system by simply placing a slip tube 22 of appropriate size and material choice onto one or more sections of the rotating drive shafts 21 thereof.

The present slip tube system offers other advantages in that different formulations of the same thermoplastic material can easily be used for the slip tube 22, and each formulation can have unique and different mechanical properties such as a different coefficient of friction. A simple replacement of one sleeve of one formulation with another sleeve with a different formulation can alter both of the first and second coefficients of friction, and the drive forces applied to the trolleys. This simple act can easily increase or decrease the driving abilities of the slip tube system by changing the pair of coefficients of friction associated with one formulation with another pair of coefficients of friction associated with a second formulation. This easy interchange of slip tubes 22 enables the slip tube system to be "tuned" at each segment of the rotating drive shaft 21 with an optimal formulation with increased or decreased frictional forces between the rotating drive shaft 21 and the slip tube 22. This is advantageous for segments of the drive shaft 22 with upward inclines where a higher set of frictional coefficients is desirable. Coatings 50 can also be applied to any surface of any formulation of the slip tube 22.

Additionally, the present slip tube system offers increased drive force by slightly increasing the diameter of the rotating drive shaft 21 and thereby compressing the spring 46 in the trolleys 42 an additional amount to increase the spring bias pressure in the trolley 42. Since friction is dependent on the bias force, the increase in spring pressure increases the drive force of the slip tube system. As shown in FIG. 3, the slip tube 22 has a thickness 35 pinched between the rotating drive shaft 21 and the canted pinch rollers 45. This thickness 35 increases the deflection of the spring 46 (FIG. 1), increases the spring biasing force on the rotating drive shaft 21, and increases the drive force delivered to the trolley 40, 41.

Figure 4:
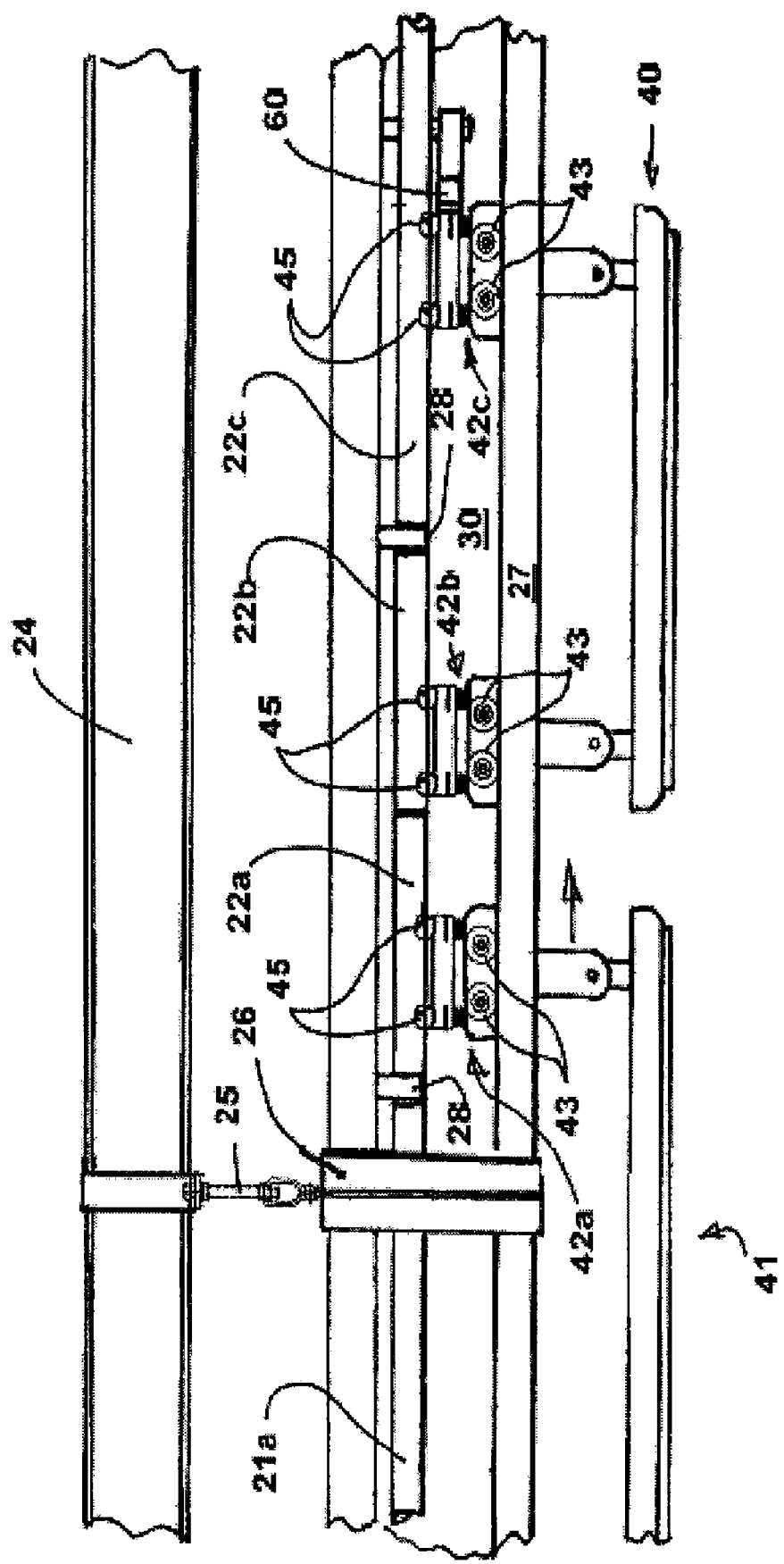
FIG. 4 is a partial side view of the slip tube system of FIG. 1 with one of two trolleys moved to a different position by the slip tube drive.

As best shown in FIGS. 2 and 4, another embodiment of the present slip tube system also permits introduction of a power-and-free element for drive tube conveyors to permit accumulation of carriages such as trolleys 40, 41 anywhere along the line. This is typically required for situations involving variations in work flow, or where tracks need to be arranged to carry trolleys loaded with components at different speeds or rates through various manufacturing or business operations. Similarly, a power-and-free slip tube system permits trolleys or carriers to be stopped at predetermined locations for loading, assembly, storage, sorting, finishing or inspection. Due to their versatility, this element can greatly increase the productivity of companies employing just-in-time or lean manufacturing methods.

In FIG. 2, one embodiment is shown with the leftmost trolley 41 being driven to the right (see arrow) by the engagement of the leftmost rotating drive shaft 21*a* with the carriage 42*a* of trolley 41. The center drive shaft 21*b* is rotating and is covered by independent and separate slip tube 22*b* and separate slip tube 22*b*. The right drive shaft 21*c* is rotating and is covered by slip tube 22*c*. The rightmost trolley 40 is stopped by when carriage 42*c* comes into hard contact with a stop 60 which prevents further rightward motion of the trolley 40. The stopped driven rollers 45 prevent rotation of separate slip tube 22*b* and slip tube 22*c* and engagement of the separate slip tube 22*b* and slip tube 22*c* changes from driving engagement to slipping engagement. Rotating drive shafts 21*b* and 21*c* continue to rotate under stationary separate slip tube 22*b* and slip tube 22*c* which now act as slipping clutches.

In FIG. 4, the rightmost carriage 40 remains stopped with the rotating drive shafts 21*b* and 21*c* continuing to rotate under slip tubes 22*a*, 22*b*, and 22*c*. The carriage 42*a* of trolley 41 has moved from driving engagement with rotating drive shaft 21*a* and is in driving engagement with separate slip tube 22*a*. This driving engagement has engaged separate slip tube 22*a* with rotating shaft 21*b* to propel trolley 41 to the right towards stopped trolley 40. When trolley 41 contacts stopped trolley 40, the separate slip tube 22*a* will switch from driving engagement to slipping engagement on center rotating shaft 21*b*. Without the separately drivable slip tubes 22*a* and 22*b*, the trolley 41 could not approach and contact trolley 40. Should the stop 60 be disengaged, trolley 40 will move to the right when slip tubes 22*b* and 22*c* change from slipping engagement to driving engagement with drive shafts 21*b* and 21*c*. Thus, trolley 41 will move to the right when slip tube 22*a* re-engages (i.e.: stops slipping) on drive shafts 21*b*.

In another alternate embodiment, one or more slip tubes such as slip tube 22*b* could be constructed from a low coefficient of friction material to enhance slippage between the drive shaft (such as rotating drive shaft 21*b*) and the slip tube 22*b* to thereby reduce drive forces on the stop 60. When stop 60 is released, the slip tube 22*b* continues to slip on shaft 21*b*, and the higher frictional material of slip tube 22*c* frictionally engages with shaft 62*c* to drive carriage 42*c* to the right.

Alternately, the coefficient of friction between slip tube 22*c* and rotating shaft 21*c* could be configured to slip when stopped, yet provide enough frictional force to move a load when the stop 60 is released.

It should be appreciated that any patent, publication, or other disclosure material, in whole or in part, that is the to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is the to be incorporated by reference herein, but which conflicts with existing definitions, statements, or other disclosure material set forth herein will only be incorporated to the extent that no conflict arises between that incorporated material and the existing disclosure material.

While the present the slip tube system has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

For example,

What is claimed:

1. A slip tube system for propelling at least one load along a conveying path of an overhead conveyor system, comprising:
    a stationary frame extending along the conveying path;
    a rotating drive shaft extending along the conveying path and mounted to the stationary frame, the rotating drive shaft rotating about a shaft axis parallel to the conveying path and having an outer surface extending there along;
    a hollow slip tube mounted on the rotating drive shaft and having an inner slip tube diameter larger than an outer diameter of the rotating drive shaft to provide slipping engagement therebetween, the hollow slip tube further comprising an outer sleeve diameter larger than the inner sleeve diameter and an outer drive surface extending therealong;
    a carriage configured to carry the at least one load along the conveying path;
    at least one driven wheel mounted on the carriage and free to rotate thereto, the at least one driving wheel canted at an angle to the shaft axis of the drive shaft and configured to engage with the outer drive surface of the hollow slip tube slidingly mounted on the rotating drive shaft, wherein when the least one driving wheel is engaged with the outer drive surface of the hollow slip tube, the hollow slip tube is tractionally biased from slipping engagement into rotating driven engagement with the rotating drive shaft and the rotating outer drive surface of the rotating hollow slip tube tractionally engages with the at least one driving wheel with sufficient traction so as to form a helical loci of engagement therewith to propel the carriage along the conveying path.

2. The slip tube system in claim 1, wherein the inner diameter of the hollow slip tube exceeds the outer diameter of the rotating drive shaft by 0.030" or less.

3. The slip tube system of claim 1, wherein hollow slip tube is composed of a high frictional material such as Butyrate.

4. The slip tube system of claim 1, wherein hollow slip tube is composed of a low frictional material such as polytetraflouroethylene (PTFE).

5. The slip tube system of claim 1, wherein the hollow slip tube has the outer drive surface and an inner surface, and at least one of the outer drive surfaces and the inner surface is coated with a coating to change the frictional characteristics thereof.

6. The slip tube system of claim 1, wherein a coefficient of friction between the rotating drive shaft and the hollow slip tube is different from a coefficient of friction between the least one driven wheel and the hollow slip tube.

7. The slip tube system of claim 6, wherein the coefficient of friction between the rotating drive shaft and the hollow slip tube is lower than the coefficient of friction between the least one driven wheel and the hollow slip tube.

8. The slip tube system of claim 1 wherein the hollow slip tube mounted on the rotating drive shaft comprises a split sleeve having a first longitudinal portion and a second longitudinal portion in an end-to end configuration with each longitudinal portion configured to rotate around the rotating drive shaft independently from the other, wherein when the least one driven wheel comes into contact with the first longitudinal portion of the split sleeve, the first longitudinal portion is biased into driving engagement with the rotating drive shaft to propel the at least one driven wheel and the carriage along the first longitudinal portion towards the second longitudinal portion.

9. The slip tube system of claim 8 wherein when the least one driven wheel comes into contact with both the first longitudinal portion and the second longitudinal portion of the split sleeve, both the first longitudinal portion and the second longitudinal portion are biased into driving engagement with the rotating drive shaft to propel the at least one driven wheel from the first longitudinal portion towards the second longitudinal portion.

10. The slip tube system of claim 8 wherein when the least one driven wheel is engaged with the second longitudinal portion of the split sleeve, the second longitudinal portion is biased into driving engagement with the rotating drive shaft to propel the at least one driven wheel and the carriage along the second longitudinal portion away from the first longitudinal portion without rotationally affecting the first longitudinal portion.

11. A slip sleeve system for propelling at least one load along a conveying path of an overhead conveyor system, comprising:
    a stationary frame extending along the conveying path;
    a rotating drive shaft extending along the conveying path and mounted to the stationary frame for rotation about a shaft axis that is parallel to the conveying path, the rotating drive shaft further comprising an exterior surface having an outer diameter;
    a hollow sleeve mounted on the rotating drive shaft and having an inner sleeve diameter larger than the outer diameter of the drive shaft and an outer sleeve surface having an outer sleeve diameter larger than the inner sleeve diameter, wherein the hollow sleeve and the rotating drive shaft have rotational sliding engagement therebetween;
    a carriage configured to carry the load along the conveying path;
    at least one driven wheel mounted on the carriage and free to rotate thereto, the at least one driving wheel canted at an angle to the shaft axis of the drive shaft and configured to engage with the outer sleeve surface of the hollow sleeve slidingly mounted on the rotating drive shaft, wherein when the least one driving wheel is engaged with the outer sleeve surface of the hollow sleeve, the hollow sleeve is biased from slipping engagement into rotating driven engagement with the rotating drive shaft and the rotating outer sleeve surface of the rotating hollow sleeve engages with the at least one driving wheel with sufficient traction so as to form a helical loci of engagement therewith to propel the carriage along the conveying path;
    a carriage stop configured to stop the carriage, wherein when the carriage encounters the stop, the hollow sleeve in helical engagement with the at least one driven wheel is further configured to change from driving engagement with the rotating drive shaft to slipping engagement with the rotating drive shaft.

12. The slip sleeve system of claim 11 wherein the carriage stop is further configured with a release, wherein when the release is activated, the sleeve mounted on the rotating drive shaft changes from slipping engagement with the rotating drive shaft to driving engagement with the rotating drive shaft to drive the at least one driven wheel with sufficient traction to move the carriage along the conveying path.

13. The slip sleeve system of claim 11 wherein the hollow sleeve mounted on the rotating drive shaft comprises a split sleeve having a first longitudinal portion and a second longitudinal portion in an end-to end configuration, wherein each of the first longitudinal portion and the second longitudinal portion are configured to move independently from the other and the stop is positioned to stop the carriage on the second longitudinal portion of the hollow sleeve after the carriage has been driven along the first longitudinal portion and onto the second longitudinal portion.

14. The slip sleeve system of claim 13 further comprising a second carriage, wherein when the second carriage is in driving engagement with the first longitudinal portion of the hollow sleeve and the first longitudinal portion of the hollow sleeve is rotating in driving engagement with the rotating drive shaft, the second portion of the longitudinal sleeve in contact with the carriage is stationary and in sliding engagement with the rotating drive shaft.

15. The slip sleeve system of claim 14 wherein when the second carriage is in contact with the stopped first carriage, the first longitudinal portion of the hollow sleeve changes from rotating driving engagement with the rotating drive shaft to stationary slipping engagement with the rotating drive shaft.

16. A method for adjusting the coefficient of friction of a rotating drive shaft in an overhead conveyor system for carrying a load along a conveying path wherein the method comprises:
introducing at least one slip tube concentrically mounted on the rotating drive shaft to surround an outer surface thereof the rotating drive shaft and configured to rotate thereabout, the slip tube comprising an inner cylindrical surface with a preselected coefficient of friction and an outer surface having a second preselected coefficient of friction, wherein the inner cylindrical surface has an inner diameter larger than an outer diameter of the drive shaft;

engaging the load with the at least one slip tube to frictionally engage the inner cylindrical surface of the at least one slip tube with the rotating drive shaft to move the load along the conveying path.

17. The method of claim 16 further including the step of frictionally engaging the load with the outer surface of the at least one slip tube with the second preselected coefficient of friction to create a helical loci of frictional engagement to propel the load along the conveying path.

18. The method of claim 16 further including the step of moving the load into a stop to change the frictional engagement of the least one slip tube with the rotating drive shaft from driving engagement to slipping engagement.

19. The method of claim 18 further including the step of releasing the stop to change the frictional engagement of the least one slip tube with the rotating drive shaft from slipping engagement back to driving engagement.

20. The method of claim 18 wherein when the load is stopped, the at least one slip tube in slipping engagement with the rotating drive shaft is stopped.

* * * * *